US009132794B2

(12) United States Patent
Nagaya et al.

(10) Patent No.: US 9,132,794 B2
(45) Date of Patent: Sep. 15, 2015

(54) VEHICLE FRONT BODY STRUCTURE

(71) Applicant: Fuji Jukogyo Kabushiki Kaisha, Tokyo (JP)

(72) Inventors: Hiroki Nagaya, Tokyo (JP); Kyohei Suwa, Tokyo (JP); Hiroshi Suemune, Tokyo (JP); Koichi Imamura, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/218,347

(22) Filed: Mar. 18, 2014

(65) Prior Publication Data

US 2014/0284947 A1 Sep. 25, 2014

(30) Foreign Application Priority Data

Mar. 25, 2013 (JP) ................................. 2013-062102

(51) Int. Cl.
| B60R 21/34 | (2011.01) |
| B60R 19/52 | (2006.01) |
| B60R 19/34 | (2006.01) |
| B62D 21/15 | (2006.01) |
| B62D 25/08 | (2006.01) |
| B60R 19/18 | (2006.01) |

(52) U.S. Cl.
CPC ................ *B60R 19/34* (2013.01); *B60R 19/18* (2013.01); *B62D 21/152* (2013.01); *B62D 25/082* (2013.01); *B60R 2019/1873* (2013.01)

(58) Field of Classification Search
CPC .............. B60R 19/52; B60R 2019/522; B60R 2019/525; B60R 2019/527; B60R 21/34; B60R 2021/0037; B60R 2021/003; B60R 2021/0004; B60R 2021/343

USPC ............ 296/187.04, 187.09, 193.09, 203.02; 293/102
See application file for complete search history.

(56) References Cited

U.S. PATENT DOCUMENTS

| 6,155,633 | A | * | 12/2000 | Minami et al. | ........... 296/193.09 |
| 7,270,368 | B2 | * | 9/2007 | Aonuma et al. | ......... 296/203.02 |
| 7,438,348 | B2 | * | 10/2008 | Nakamae et al. | ........ 296/187.04 |
| 7,992,926 | B2 | * | 8/2011 | Tamakoshi | ............... 296/187.09 |
| 8,042,847 | B2 | * | 10/2011 | Garg et al. | ...................... 293/102 |
| 8,118,351 | B2 | * | 2/2012 | Gonin et al. | ............. 296/193.09 |
| 8,220,576 | B2 | * | 7/2012 | Terada et al. | ................ 180/68.4 |
| 8,246,105 | B2 | * | 8/2012 | Mildner | ................... 296/187.09 |
| 8,251,437 | B2 | * | 8/2012 | Gonin et al. | ............. 296/187.09 |

(Continued)

FOREIGN PATENT DOCUMENTS

| JP | 2006-264495 | 10/2006 |
| JP | 2007-001358 | 1/2007 |
| JP | 2011-218911 | * 11/2011 ............. B60R 19/12 |

*Primary Examiner* — Gregory Blankenship
(74) *Attorney, Agent, or Firm* — Smith, Gambrell & Russell, LLP

(57) ABSTRACT

A vehicle front body structure includes: a vehicle body structural member disposed below a front end of a hood and extends substantially along the vehicle width direction; and an energy absorbing member that protrudes toward a vehicle front side from the vehicle body structural member, extends substantially along the vehicle width direction, and deforms so as to absorb energy upon a collision. The energy absorbing member is secured to the vehicle body structural member at opposite ends of the energy absorbing member in the vehicle width direction. A clearance is defined between a central part of the energy absorbing member in the vehicle width direction and the vehicle body structural member.

18 Claims, 8 Drawing Sheets

(56) References Cited

U.S. PATENT DOCUMENTS

| | | | |
|---|---|---|---|
| 8,267,446 B2* | 9/2012 | Gonin | 293/136 |
| 8,348,333 B2* | 1/2013 | Iammarino et al. | 296/187.09 |
| 8,424,629 B2* | 4/2013 | Ralston et al. | 180/274 |
| 8,459,728 B2* | 6/2013 | Fujii et al. | 296/203.02 |
| 8,567,854 B2* | 10/2013 | Nishi et al. | 296/193.09 |
| 8,651,559 B2* | 2/2014 | Kitaizumi | 296/187.09 |
| 8,789,874 B2* | 7/2014 | Okamura et al. | 296/187.09 |
| 8,931,824 B2* | 1/2015 | Lopez et al. | 296/187.04 |
| 2009/0146456 A1* | 6/2009 | Saitou et al. | 296/187.09 |
| 2014/0132033 A1* | 5/2014 | Townson et al. | 296/193.1 |

\* cited by examiner

VEHICLE FRONT BODY STRUCTURE

CROSS REFERENCES TO RELATED APPLICATIONS

The present application claims priority from Japanese Patent Application No. 2013-062102 filed on Mar. 25, 2013, the entire contents of which are hereby incorporated by reference.

BACKGROUND

1. Technical Field

The present invention relates to a vehicle front body structure and more particularly relates to a vehicle front body structure that can enhance protection for the femoral region of a pedestrian and can reduce damage to a vehicle body at a light collision.

2. Related Art

A vehicle front body structure for a vehicle such as an automobile is required to have enhanced protection for a pedestrian so as to reduce damage to the pedestrian at a collision between the vehicle and the pedestrian.

When a passenger car having a typical vehicle height collides with a pedestrian, a part near a front end of a hood often collides with the femoral region of the pedestrian. Accordingly, in order to suppress damage to the femoral region, the vehicle is required to have a structure that can effectively absorb energy at the hood front end.

As related art concerning a vehicle front body structure for protection of the femoral region of a pedestrian, for example, Japanese Unexamined Patent Application Publication (JPA) No. 2006-264495 discloses a structure in which a bracket protrudes forward from a radiator upper support disposed below a hood front end and absorbs energy upon a collision between a pedestrian and the vehicle, so that damage to the pedestrian can be reduced.

Also, JP-A No. 2007-1358 discloses a structure including a pedestrian protection member made of a sheet metal panel and disposed in front of a bumper beam.

It is possible to enhance protection for a pedestrian with an energy absorbing member attached to a support member on an upper end of a radiator, as disclosed in JPA No. 2006-264495.

However, in the case where a vehicle lightly collides against, for example, another vehicle, or a wall, and the energy absorbing member receives a larger load than a load generated at a collision with a pedestrian, the energy absorbing member may press a vehicle body structural member and result in damage to the vehicle body structural member. Accordingly man-hours for repair, repair cost, and the like may increase.

SUMMARY OF THE INVENTION

The present invention has been designed in consideration of the circumstances described above, and an object of the invention is to provide a vehicle front body structure that can enhance protection for the femoral region of a pedestrian and reduce damage to a vehicle body at a light collision.

An aspect of the present invention provides a vehicle front body structure including: a vehicle body structural member disposed below a front end of a hood and extends substantially along the vehicle width direction; and an energy absorbing member protruding toward a vehicle front side from the vehicle body structural member, and extending substantially along the vehicle width direction, the energy absorbing member being configured to deform so as to absorb energy upon a collision. The energy absorbing member is secured to the vehicle body structural member at opposite ends of the energy absorbing member in the vehicle width direction. A clearance is defined between a central part of the energy absorbing member in the vehicle width direction and the vehicle body structural member.

A weak portion having a low fracture and deformation strength against a compressive load in the vehicle longitudinal direction may be provided in the vicinity of a coupler of the energy absorbing member and the vehicle body structural member.

A rear edge of the energy absorbing member at a central part in the vehicle width direction may be formed in an arch-like shape that is convex toward a vehicle front side.

The vehicle body structural member, to which the energy absorbing member is attached, may be a substantially rectangular frame member that holds a cooling device. The opposite ends of the energy absorbing member may be attached near a connecting portion of an upper edge and a side edge of the frame member.

A bumper beam may be provided below the energy absorbing member. A front end of the energy absorbing member may be disposed so as to protrude toward a vehicle front side beyond a straight line connecting the front end of the hood and the front end of the bumper beam.

The front side of the energy absorbing member may have concave and convex shapes extending in the vehicle width direction.

DETAILED DESCRIPTION

Figure 1:
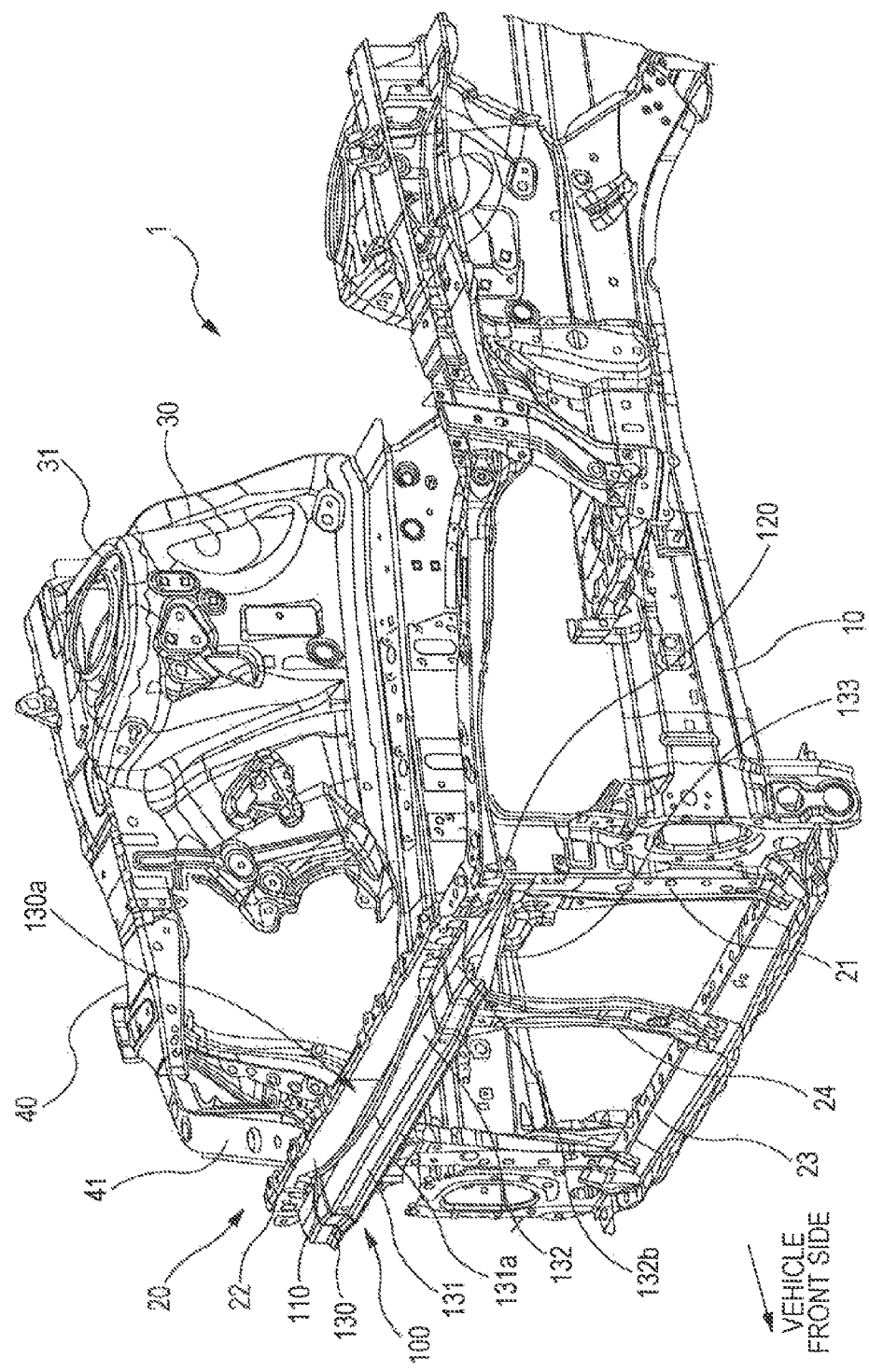
FIG. 1 is a perspective view of a vehicle front body structure according to an implementation of the invention, illustrating the structure viewed from a vehicle front side and obliquely downward.
Figure 2:
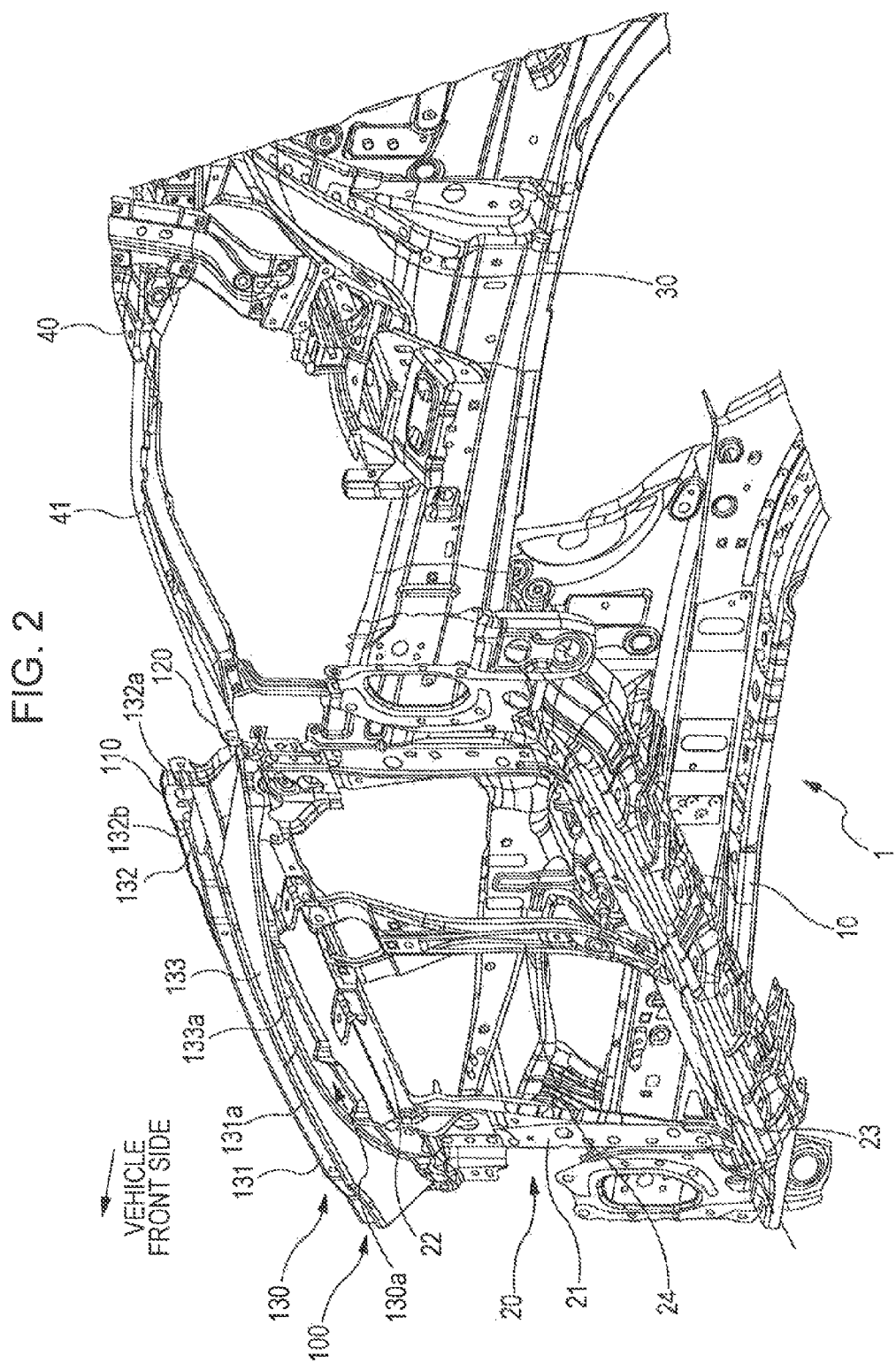
FIG. 2 is a perspective view of the vehicle front body structure according to the implementation, illustrating the structure viewed from a vehicle front side and obliquely upward.
Figure 3:
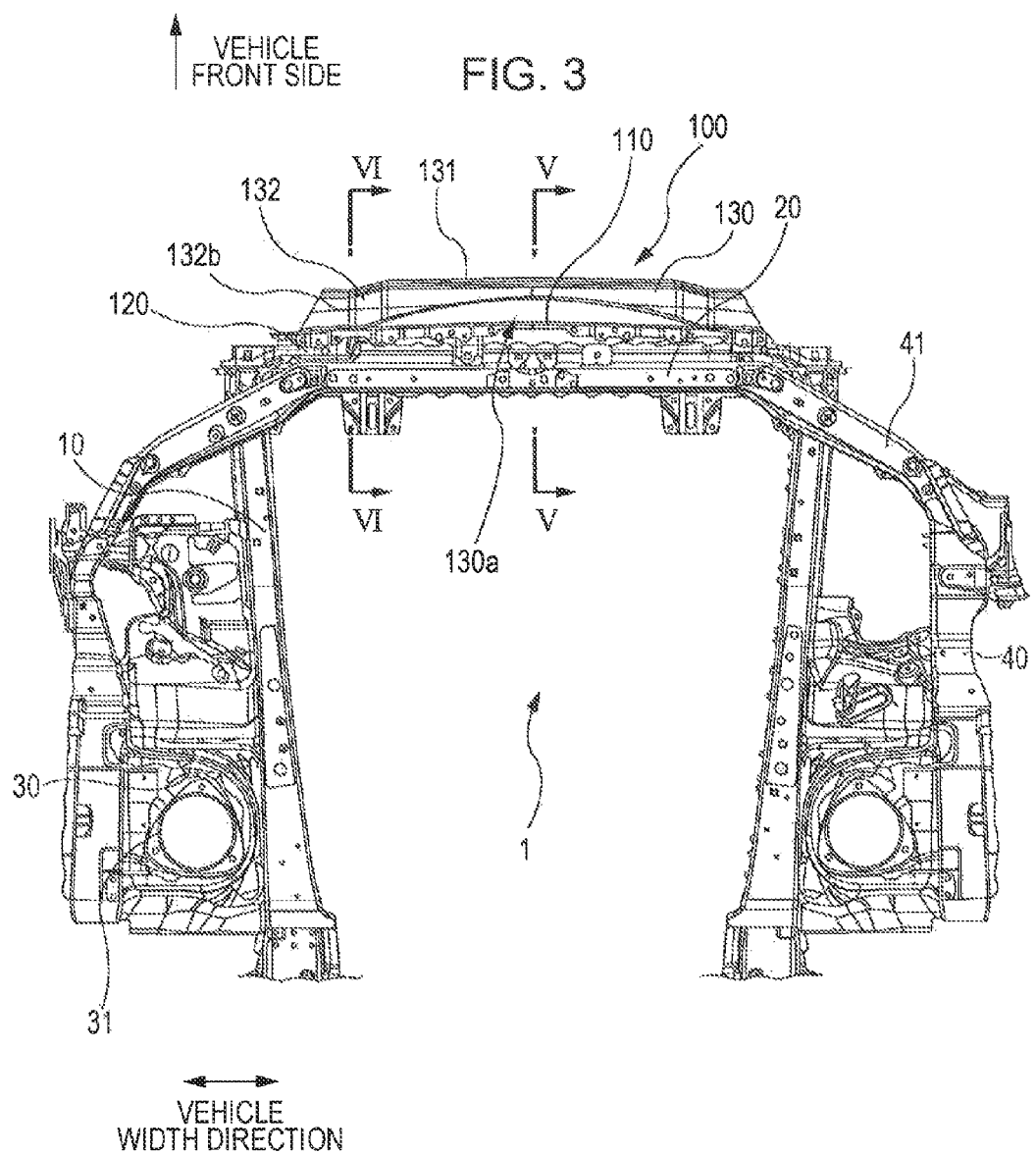
FIG. 3 is a plan view of the vehicle front body structure of the implementation, illustrating the structure viewed downward.
Figure 4:
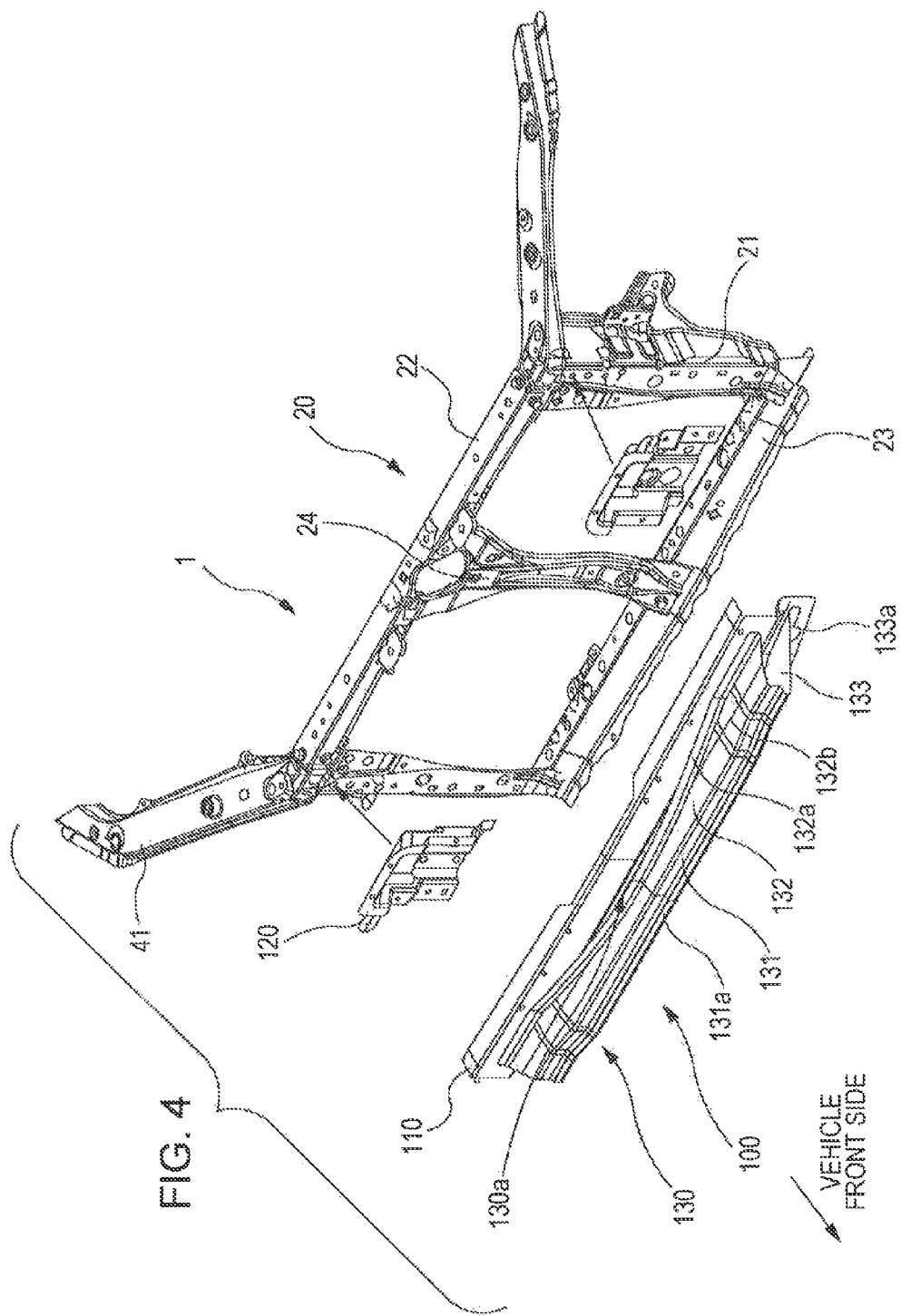
FIG. 4 is an exploded perspective view of peripheral parts on an energy absorbing member for the vehicle front body structure of the implementation.

An implementation of a vehicle front body structure according to the invention will be described below by referring to FIG. 1 through FIG. 6. The vehicle front body structure of the implementation is disposed on a front section of a vehicle such as a passenger car.

In FIG. 1 through FIG. 4, vehicle exterior members and an engine, auxiliary equipment, suspension and the like are omitted from the drawings in order to make it easy to understand the implementation.

A vehicle front body structure 1 includes a pair of front side frames 10, a radiator panel 20, a strut container 30, a front upper frame 40, a hood 50 (see FIG. 5), a bumper face 60 (see FIG. 5), a bumper beam 70 (see FIG. 5), an energy absorbing member 100, and the like.

The front side frames 10 extend substantially along the longitudinal direction of the vehicle, and are spaced apart from each other in the vehicle with. They are main structural members of the vehicle body. Each front side frame 10 protrudes toward the vehicle front side from a lower end of a toe board (not shown) that is used as a partition between a vehicle cabin and an engine compartment at the vehicle front side. The front side frames 10 are disposed along the right and left sides of the engine compartment. Each front side frame 10 has a closed rectangular shape in cross section when viewed from the vehicle front side.

The radiator panel 20 has a frame-like shape and is attached to a front end of the front side frame 10. The radiator panel 20 holds a radiator core and a condenser for an air conditioner, which are not shown in the drawings. The radiator panel 20 includes a radiator panel side member 21, a radiator panel upper member 22, a radiator panel lower member 23, a center member 24.

The radiator panel side members 21 constitute the right and left sides of the radiator panel 20. Each radiator panel side member 21 is formed to have a column-like shape that extends in a vertical direction. The radiator panel side member 21 at its outer side in the vehicle width direction and at intermediate portion in the vertical direction is connected to the front side frame 10 at its inner side surface in the vehicle with direction and in the vicinity of the front end of the frame 10.

The radiator panel upper member 22 couples upper ends of the right and left radiator panel side members 21. The radiator panel upper member 22 has a beam-like shape that extends in the vehicle width direction.

The radiator panel lower member 23 couples lower ends of the right and left radiator panel side members 21. The radiator panel lower member 23 has a beam-like shape that extends in the vehicle width direction.

The center member 24 connects the radiator panel upper member 22 and the radiator panel lower member 23 in the vertical direction at their intermediate portions in the vehicle width direction.

A hood catcher (not shown) that locks a front end of the hood 50 is attached to a central part of the radiator panel upper member 22 in the vehicle width direction.

The strut container 30 contains a strut disposed on a MacPherson strut front suspension (not shown). The strut container 30 protrudes upward in the vertical direction and outward in the vehicle width direction from an outer part in the vehicle width direction at a rear part of the front side frame 10. A strut upper mount 31 disposed on an upper end of the strut container 30 supports an upper end of the strut so that the strut can rotate around a central axis of a rod.

The front upper frame 40 couples an upper part of the strut container 30 and a side end of the radiator panel upper member 22 together with a headlight upper member 41. The front upper frame 40 protrudes forward from an upper part of the strut container 30. A front end of the front upper frame 40 is connected to the headlight upper member 41 that holds an upper part of a headlight unit (not shown). The headlight upper members 41 protrude outward in the vehicle width direction from right and left side ends of the radiator panel upper member 22.

Figure 5:
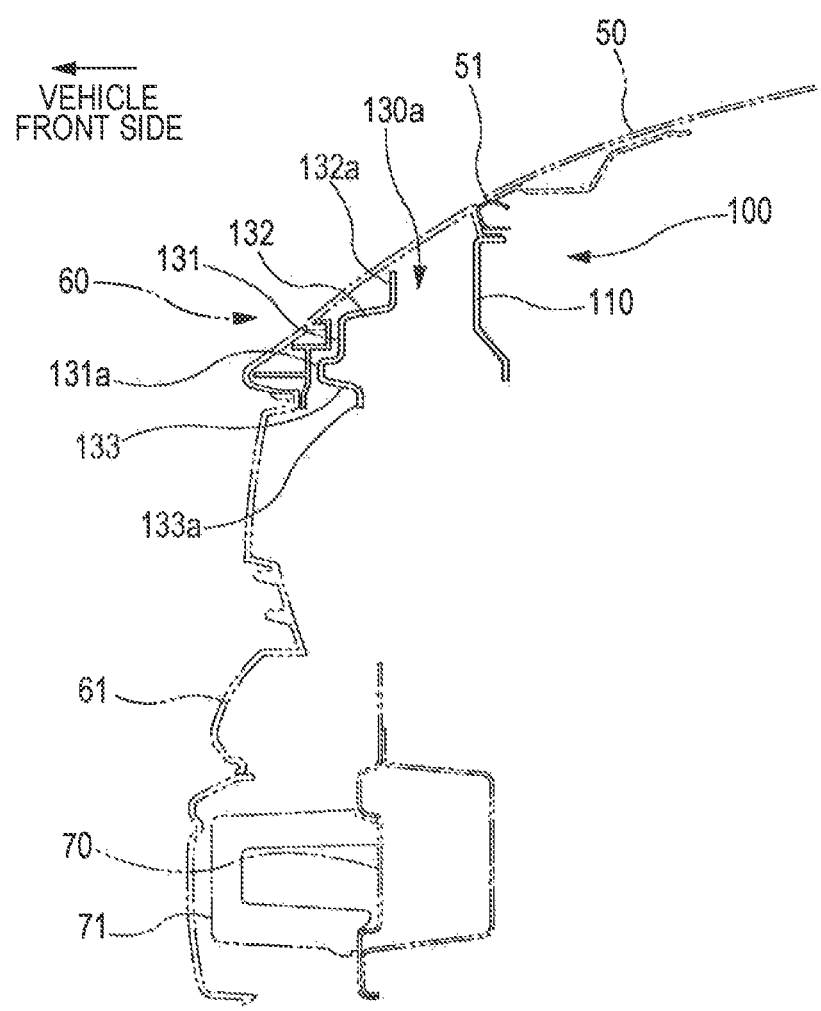
FIG. 5 is a cross-sectional view of the vehicle front body structure taken along a line V-V in FIG. 3.
Figure 6:
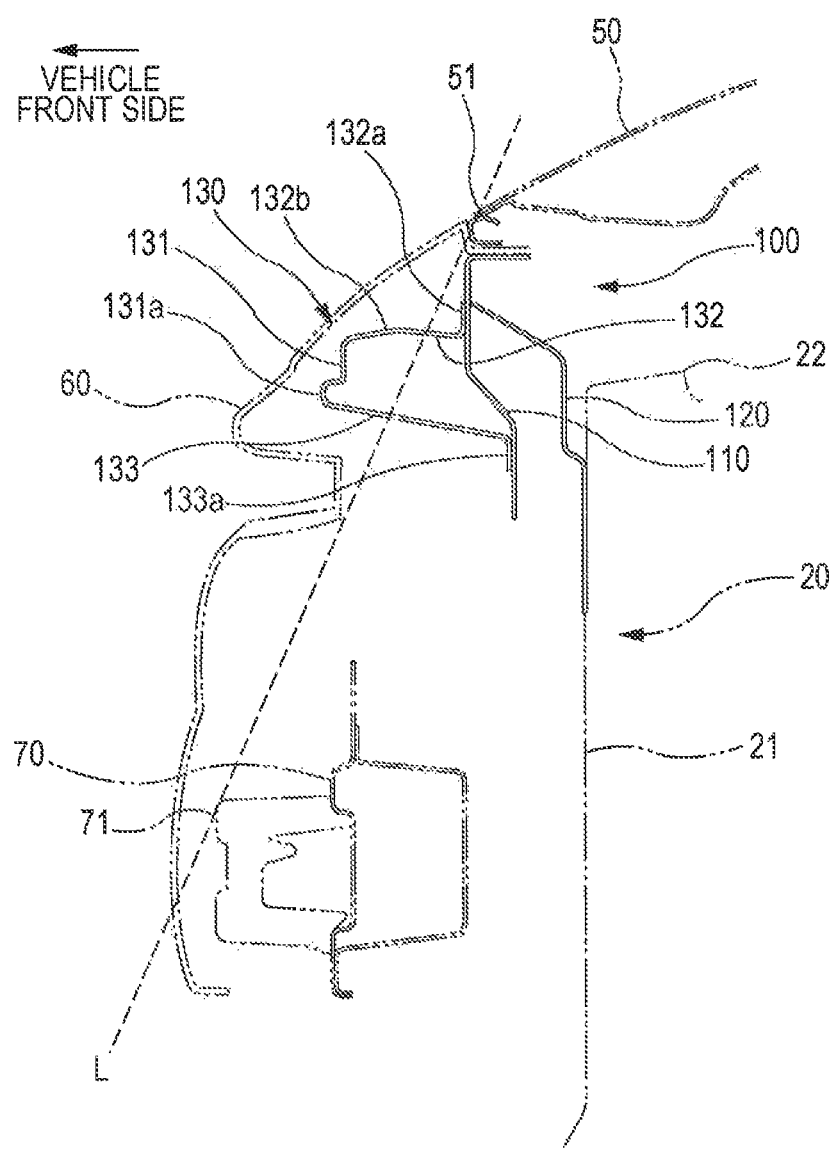
FIG. 6 is a cross-sectional view of the vehicle front body structure taken along a line VI-VI in FIG. 3.

The hood 50 shown in FIG. 5 and FIG. 6 is a lid that is openable and closable on an upper part of the engine compartment. The hood 50 is attached to the vehicle body pivotally around a hinge (not shown) provided on a rear end of the hood 50. A striker (not shown) that engages with the hood catcher attached to the radiator panel upper member 22 is provided on a lower part of the hood 50 near a front end thereof. The hood 50 is provided on its front end with a seal 51 made of rubber.

The bumper face 60 illustrated in FIG. 5 and FIG. 6 is an exterior member made of a resin material such as a polypropylene (PP) base resin. The bumper face 60 is disposed on a front end part of the vehicle. An upper end of the bumper face 60 is disposed adjacent to a front end part of the hood 50. The bumper face 60 is provided on its front face with a grill 61 that takes in a vehicle-travelling wind.

The bumper beam 70 opposes a rear side of the bumper face 50 in the vehicle longitudinal direction and has a beam-like shape that extends substantially in the vehicle width direction. The bumper beam 70 transmits a load at a head-on collision of the vehicle. The rear side of the bumper beam 70 is coupled through a stay (not shown) to a front end of the front side frame 10. The bumper beam 70 is formed by, for example, assembling panels made of press-molded steel sheets so as to have a closed cross section. An energy absorbing element 71 made of, for example, a foamed material is attached to a front side of the bumper beam 70 and protrudes forward in the vehicle longitudinal direction.

The energy absorbing member 100 protrudes toward the front side of the vehicle from the radiator panel upper member 22 and absorbs energy through deformation upon a collision between the vehicle and the femoral region of a pedestrian and a light collision between the vehicle and another vehicle. The energy absorbing member 100 includes a base panel 110, a bracket 120, a main body 130, and the like. These members are formed with panels made of press-molded steel sheets and are connected with one another by spot welding or the like.

The base panel 110 is a panel-like member and a base to which the main body 130 is attached. The base panel 110 extends substantially along the vertical direction and the vehicle width direction. An upper part of the base panel 110 protrudes forward from a lower part of the base panel 110 in a stepped shape. An upper end of the base panel 110 is secured to an upper end of the bumper face 60.

The bracket 120 connects right and left side ends of the base panel 110 with a connecting portion (corner) between a side end of the radiator panel upper member 22 of the radiator panel 20 and an upper end of the radiator panel side member 21. The bracket 120 is disposed so as to protrude toward a vehicle rear side from a rear end of the base panel 110.

The main body 130 is disposed on a front side of the base panel 110 so as to protrude forward and is mainly used to absorb energy upon a collision. As illustrated in FIG. 5 and FIG. 6, the main body 130 includes a front side 131, an upper side 132, a lower side 133, and the like, which are integrally formed.

The front side 131 has a surface extending along the vertical direction and the vehicle width direction. The front side 131 opposes and is spaced apart from a rear side near the upper end of the bumper face 60. The front side 131 is provided on its lower part with a rib 131a that protrudes toward the front side of the vehicle. The rib 131a is extends over substantially the whole length of the main body 130 in the longitudinal direction (right and left directions) of the main body 130. A front end of the rib 131*a* is disposed so as to protrude toward the front side of the vehicle ahead of a straight line L (see FIG. 6) that connects the front end of the hood 50 and the front end of the energy absorbing element 71 of the bumper beam 70.

The upper side 132 protrudes toward a rear side from an upper end of the front side 131. The upper side 132 is provided on its rear end with a flange 132*a* that protrudes upward. The flange 132*a* is secured to an upper part on the front side of the base panel 110 by, for example, spot welding.

As illustrated in FIG. 6, an edge line 132*b* is disposed on the upper side 132 at its intermediate part in the vehicle longitudinal direction and at its opposite ends in the vehicle width direction. The edge line 132*b* is formed by bending the upper side 132 so as to define a convex shape at the top face of the upper side 132. The edge line 132*b* extends substantially along the vehicle width direction. When a compressive load is applied to the main body 130 in the vehicle longitudinal direction, the edge line 132*b* functions as the weak portion to induce a buckling deformation of the upper side 132.

A patch or a doubler (not shown) may be provided on a rear surface on a connecting portion between the front side 131 and the upper side 132 so as to increase stiffness of a front end part of the energy absorbing member and to accelerate a response to a load at the beginning of a collision.

The lower side 133 protrudes toward a rear side from a lower end of the front side 131. The lower side 133 is provided on it rear end with a flange 133*a* that protrudes downward. The flange 133*a* is secured to a lower part of the front side of the base panel 110 by, for example, spot welding.

The front side 131 is formed in a slightly curved shape such that a vehicle front side is convex in plan view.

A space 130*a* is provided on the back side of the main body 130 at its central part in the vehicle width direction. The space 130*a* is defined by forming rear edges of the upper side 132 and the lower side 133 in an arch-like shape being concave toward front. Rear edges of the upper side 132 and the lower side 133 in the space 130*a* are opposed to and spaced apart from the base panel 110. The edge line 132*b* on the upper side 132 is separated apart by the space 130*a* so as to be arranged on both sides of the space 130*a*.

Next, behaviors and operational effects in the above implementation at a collision will be described below.

Figure 7A:
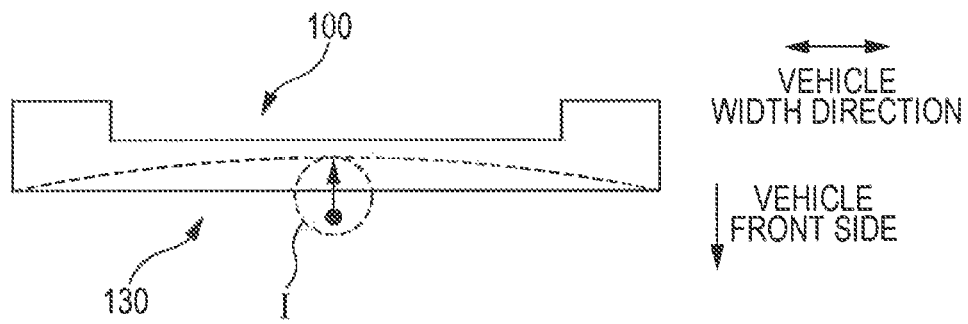
FIG. 7A is a schematic plan view illustrating a collision between the energy absorbing member for the vehicle front body structure according to the implementation and the femoral region of a pedestrian.
Figure 7B:
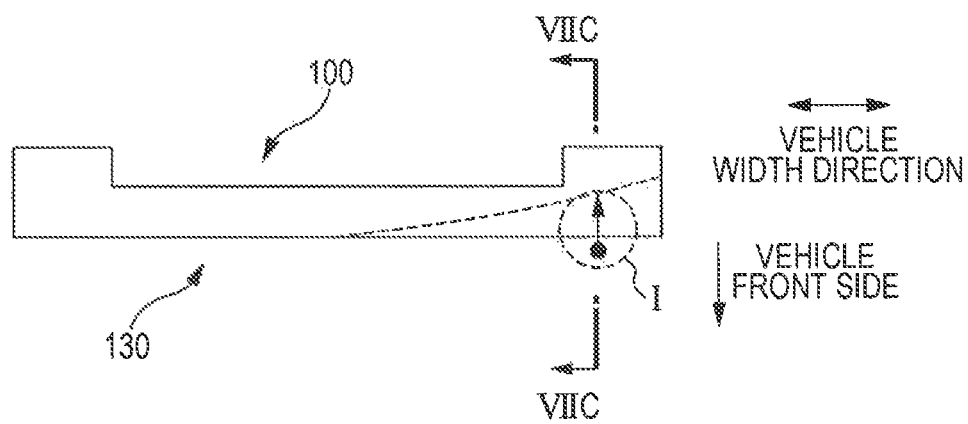
FIG. 7B is a schematic plan view illustrating a collision between the energy absorbing member for the vehicle front body structure according to the implementation and the femoral region of the pedestrian.
Figure 7C:
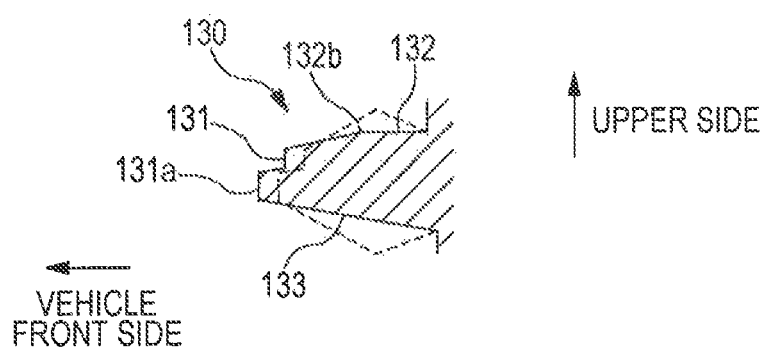
FIG. 7C is a cross-sectional view of the energy absorbing member according to the implementation taken along a line VIIC-VIIC in FIG. 7B.

FIG. 7A through FIG. 7C are schematic views of the energy absorbing member of the vehicle front body structure in the implementation of the invention upon a collision between the energy absorbing member and the femoral region of a pedestrian. FIG. 7A is a schematic plan view of the energy absorbing member, illustrating a collision between a central part of the main body of the energy absorbing member in a vehicle width direction and an impactor that simulates the femoral region of the pedestrian.

An impactor I has a column-like shape that simulates the size, mass, hardness, and the like of the femoral part region of a pedestrian. At a collision between the impactor I and a central part of the main body 130, the central part of the main body 130 deforms and bends so that the central part is retracted with respect to the opposite side ends of the main body 130 and the space 130*a* is narrowed. This deformation absorbs energy at a collision. At this time, since the rib 131*a* on the front side 131 suppresses local deformation of the main body 130, the rib 131*a* transmits a load in the vehicle width direction.

FIG. 7B is a schematic plan view of the energy absorbing member, illustrating a collision between a side end part of the main body of the energy absorbing member in the vehicle width direction and the impactor that simulates the femoral region of the pedestrian. FIG. 7C is a cross-sectional view of the main body of the energy absorbing member taken along a line VIIC-VIIC in FIG. 7B.

Although the main body 130 of the energy absorbing member 100 deforms in a bent state upon a collision between the impactor I and a side end part of the main body 130, the central part of the main body 130 tends to be negligibly deformed.

Thus, in the implementation, upon a collision between the impactor I and a side end part of the main body 130, the main body 130 absorbs the energy by buckling and deforming the upper side 132 and the lower side 133, as illustrated in FIG. 7C. Accordingly, the main body 130 adjusts load generated at a collision between the impactor I and a central part of the main body 130 and load generated at a collision between the impactor I and an end part of the main body 130 to be substantially uniform.

As illustrated in FIG. 7C, when a compressive load of a certain value or higher is applied to the main body 130 in the vehicle longitudinal direction, the upper side 132 is buckled and deformed so as to be convex upward while the lower side 133 is buckled and deformed so as to be convex downward. The upper side 132 is adjusted with the edge line 132*b* such that the upper side 132 reduces the load which causes buckling deformation and reduces the load transmitted to the bracket 120, the radiator panel 20, and the like.

Figure 8:
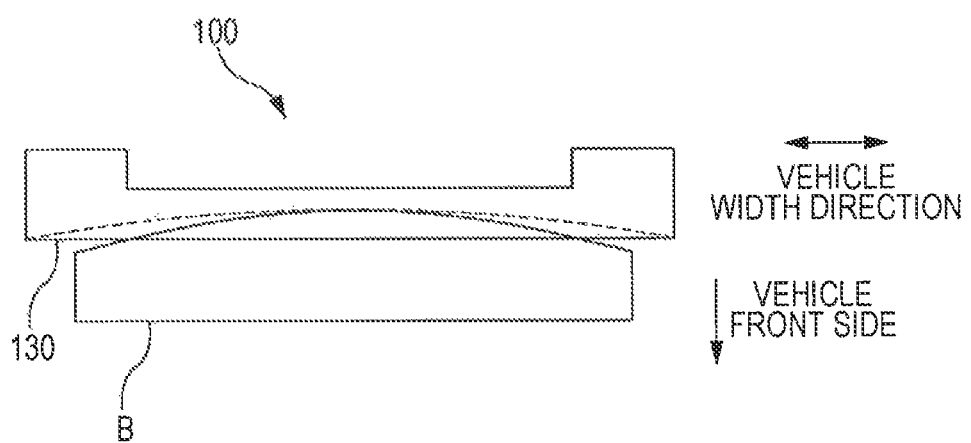
FIG. 8 is a schematic plan view illustrating a light collision between the energy absorbing member for the vehicle front body structure according to the implementation and another vehicle.

FIG. 8 is a schematic plan view of the main body of the energy absorbing member for the vehicle front body structure according to the implementation, illustrating the action of the energy absorbing member upon a light collision between the vehicle and another vehicle. FIG. 8 is a schematic view of the energy absorbing member, illustrating a light collision between a barrier B that simulates another vehicle and a central part of the main body 130 of the energy absorbing member 100 in the vehicle width direction. The barrier B applies a load to the front side 131 of the main body 130 over a relatively wide range in the vehicle width direction.

Thus, a central part of the main body 130 is retracted with respect to the side ends of the main body 130 and is bent and deformed so that the space 130*a* is narrowed and as a result the energy is absorbed. Furthermore, energy that the deformation of the main body 130 cannot absorb can be absorbed by cross-sectional deformation, as is the case with the cross-sectional deformation illustrated in FIG. 7C. At this time, the load transmitted from the side ends of the upper side 132 and the lower side 133 of the main body 130 to the base panel 110 and the bracket 120 is set to be a certain value or smaller so that the radiator panel 20 does not cause fracture and deformation.

As described above, the implementation can obtain the following effects.

(1) Since the rear edge of the main body 130 is formed in an arch-like shape so as to define the space 130*a* between the main body 130 and the base panel 110, the central part of the main body 130 is bent and deformed in the rear direction of the vehicle at a collision between the vehicle and the femoral region of a pedestrian and at a light collision between the vehicle and another vehicle, and the main body 130 can absorb the energy. At this time, since the main body 130 does not press other parts on the rear side such as the hood catcher, thereby preventing the other parts from suffering any damage.

(2) In the case where the energy cannot be sufficiently absorbed by only the deformation of the main body 130, the regions in the vicinity of the side ends of the upper side 132 and the lower side 133 can be buckled and deformed, thereby effectively absorbing the energy at a collision between the main body 130 in the vicinity of the side ends of the main body 130 and the femoral region of a pedestrian and at a light collision between the vehicle and another vehicle. Also, even if the position in the main body with which the femoral region of the pedestrian collides is shifted in the vehicle width direction, it is possible to prevent the load from being severely changed and to enhance protection for a pedestrian.

(3) The main body 130 is provided on the front side 131 with the rib 131a which extends in the vehicle width direction. Therefore, even if a collision between the femoral region of the pedestrian and a local part of the main body occurs, it is possible to disperse the load in the vehicle width direction, thereby effectively absorbing the energy.

<Modifications>

The invention is not limited to the implementation described above and various alterations and modifications may be made, which are also fall within the technical scope of the invention.

For example, shapes, structures, materials, and manufacturing methods of the respective members that constitute the vehicle front body structure are not limited to the above implementation, and may be altered, as appropriate.

The invention claimed is:

1. A vehicle front body structure including:
    a vehicle body structural member disposed below a front end of a hood and extends along the vehicle width direction; and
    an energy absorbing member protruding toward a vehicle front side from the vehicle body structural member and extending along the vehicle width direction, the energy absorbing member being configured to deform so as to absorb energy upon a collision, wherein
    the energy absorbing member is secured to the vehicle body structural member at opposite ends of the energy absorbing member in the vehicle width direction, and a clearance is defined between a central part of the energy absorbing member in the vehicle width direction and the vehicle body structural member, and
    an edge line is formed in an upper side of the energy absorbing member, the edge line defining a convex shape extending along the upper side of the energy absorbing member in the vehicle width direction, the edge line being configured to induce a buckling deformation of the energy absorbing member.

2. The vehicle front body structure according to claim 1, wherein the edge line is a weak portion having a low fracture and deformation strength against a compressive load in the vehicle longitudinal direction, and the edge line is provided in the vicinity of a coupler of the energy absorbing member and the vehicle body structural member.

3. The vehicle front body structure according to claim 1, wherein a rear edge of the energy absorbing member at a central part in the vehicle width direction is formed in an arch shape that is convex toward a vehicle front side.

4. The vehicle front body structure according to claim 2, wherein a rear edge of the energy absorbing member at a central part in the vehicle width direction is formed in an arch shape that is convex toward a vehicle front side.

5. The vehicle front body structure according to claim 1, wherein
    the vehicle body structural member, to which the energy absorbing member is attached, is a rectangular frame member that holds a cooling device; and
    the opposite ends of the energy absorbing member are attached near a connecting portion of an upper edge and a side edge of the frame member.

6. The vehicle front body structure according to claim 2, wherein
    the vehicle body structural member, to which the energy absorbing member is attached, is a rectangular frame member that holds a cooling device; and
    the opposite ends of the energy absorbing member are attached near a connecting portion of an upper edge and a side edge of the frame member.

7. The vehicle front body structure according to claim 3, wherein
    the vehicle body structural member, to which the energy absorbing member is attached, is a rectangular frame member that holds a cooling device; and
    the opposite ends of the energy absorbing member are attached near a connecting portion of an upper edge and a side edge of the frame member.

8. The vehicle front body structure according to claim 4, wherein
    the vehicle body structural member, to which the energy absorbing member is attached, is a rectangular frame member that holds a cooling device; and
    the opposite ends of the energy absorbing member are attached near a connecting portion of an upper edge and a side edge of the frame member.

9. The vehicle front body structure according to claim 2, wherein
    a bumper beam is provided below the energy absorbing member; and
    a front end of the energy absorbing member is disposed so as to protrude toward a vehicle front side beyond a straight line connecting the front end of the hood and the front end of the bumper beam.

10. The vehicle front body structure according to claim 3, wherein
    a bumper beam is provided below the energy absorbing member; and
    a front end of the energy absorbing member is disposed so as to protrude toward a vehicle front side beyond a straight line connecting the front end of the hood and the front end of the bumper beam.

11. The vehicle front body structure according to claim 4, wherein
    a bumper beam is provided below the energy absorbing member; and
    a front end of the energy absorbing member is disposed so as to protrude toward a vehicle front side beyond a straight line connecting the front end of the hood and the front end of the bumper beam.

12. The vehicle front body structure according to claim 1, wherein the front side of the energy absorbing member has concave and convex shapes extending in the vehicle width direction, with the convex shape including the edge line in the upper side of the energy absorbing member.

13. The vehicle front body structure according to claim 2, wherein the front side of the energy absorbing member has concave and convex shapes extending in the vehicle width direction, with the convex shape including the edge line in the upper side of the energy absorbing member.

14. The vehicle front body structure according to claim 3, wherein the front side of the energy absorbing member has concave and convex shapes extending in the vehicle width direction, with the convex shape including the edge line in the upper side of the energy absorbing member.

15. The vehicle front body structure according to claim 4, wherein the front side of the energy absorbing member has concave and convex shapes extending in the vehicle width direction, with the convex shape including the edge line in the upper side of the energy absorbing member.

16. The vehicle front body structure according to claim 1, wherein the edge line is disposed at an intermediate part of the upper side of the energy absorbing member in the vehicle longitudinal direction.

17. The vehicle front body structure according to claim 1, wherein the edge line is disposed at opposite ends of the upper side of the energy absorbing member in the vehicle width direction.

18. A vehicle front body structure including:
- a vehicle body structural member disposed below a front end of a hood and extends along the vehicle width direction; and
- an energy absorbing member protruding toward a vehicle front side from the vehicle body structural member and extending along the vehicle width direction, the energy absorbing member being configured to deform so as to absorb energy upon a collision, wherein
- the energy absorbing member is secured to the vehicle body structural member at opposite ends of the energy absorbing member in the vehicle width direction, and a clearance is defined between a central part of the energy absorbing member in the vehicle width direction and the vehicle body structural member,
- a bumper beam is provided below the energy absorbing member; and
- a front end of the energy absorbing member is disposed so as to protrude toward a vehicle front side beyond a straight line connecting the front end of the hood and the front end of the bumper beam.

\* \* \* \* \*